United States Patent [19]
Ishii

[11] Patent Number: 4,475,176
[45] Date of Patent: Oct. 2, 1984

[54] MEMORY CONTROL SYSTEM

[75] Inventor: Takatoshi Ishii, Oume, Japan

[73] Assignee: Tokyo Shibaura Denki Kabushiki Kaisha, Japan

[21] Appl. No.: 402,412

[22] Filed: Jul. 27, 1982

[30] Foreign Application Priority Data

Aug. 6, 1981 [JP] Japan .............................. 56-122448
Sep. 28, 1981 [JP] Japan .............................. 56-153384

[51] Int. Cl.³ ............................................. G06F 13/00
[52] U.S. Cl. .................................... 364/900; 365/230
[58] Field of Search ....... 364/200 MS FILE; 365/230 900 MS

[56] References Cited

U.S. PATENT DOCUMENTS 4,206,476 6/1980 Hashimoto .................. 365/230 X

Primary Examiner—Raulfe B. Zache
Attorney, Agent, or Firm—Cushman, Darby & Cushman

[57] ABSTRACT

A memory multiplex address system which increases the effective size of the address space of a processor. A first memory from which data is normally read and a second memory into which data is normally written are assigned the same address space. A read/write signal is employed to select the appropriate memory. In a second mode, data may be written into the first memory and read from the second memory. Alternatively, any conceivable address space layout may be employed in the second mode.

11 Claims, 12 Drawing Figures

MEMORY CONTROL SYSTEM

BACKGROUND OF THE INVENTION

The present invention relates to memory multiplex address systems.

Typically, computer processors have a certain maximum number of bits with which to specify an address. This set of addresses define an address space in which peripherals to the processor must be placed. Thus, in the prior art, read only memories (ROM's), random access memories (RAM's) and the CRT refresh memory associated with a processor include address spaces respectively allocated within the address space of the processor. FIG. 1 shows a typical example of a memory map obtained by a typical allocation of processor address spaces. As illustrated in the drawing, 16K bytes from address 0000 HEX are allocated to ROM 100, 16K bytes from address 4000 HEX to ROM 102, 16K bytes from address 8000 HEX to RAM 104, 8K bytes from address C000 HEX to RAM 106, and addresses from E000 HEX to FFFF HEX to CRT refresh memory 108. In total, the address space includes 64K bytes, the maximum number of bytes addressable with 16 bits of information.

Recently, the length and complexity of software have markedly increased, so an address space of nearly 64K bytes is required simply for operation of the program. Thus, ROM's 100 and 102 and RAM's 104 and 106 must be expanded to cover the entire 64K byte memory space.

The number of pixels included in a CRT display has also had a tendency to increase as resolution has increased. To store this increased number of pixels, an address space of nearly 16K bytes is needed for CRT refresh memory 108. This is the minimum memory capacity that will be necessary for future graphic displays.

However, the address space included in a processor is physically limited by the number of address bits that can be handled. A conventional processor can handle 16 address bits which can individually address no more than 64K bytes of memory. This results in severe restrictions in system design.

SUMMARY OF THE INVENTION

It is an object of the present invention to provide a memory multiplex address system which can substantially enlarge the address space by allowing a plurality of memory areas to be allocated to the same predetermined address space.

According to this invention, a part of the address space included in the processor is commonly utilized by a plurality of memories, whereby the address space of the processor can be enlarged without modifying the processor design, thus leading to significant software improvements.

Since the length and complexity of software are currently increasing and in view of the restrictions on the number of output/input pins of the processor and the restrictions on the number of lines in an address bus in terms of industrial standards, the present invention is very effective in practical use.

Although a system has been described above which includes a CRT refresh memory, the present invention is also applicable to a wide range of systems which include a memory which a processor will recognize as only storing data for certain periods of time.

BRIEF DESCRIPTION OF THE DRAWINGS

These and other objects and advantages of the invention will become more apparent and more readily appreciated from the following detailed description of the presently preferred exemplary embodiment of the invention taken in conjunction with the accompanying drawings, of which.

DETAILED DESCRIPTION OF THE PREFERRED EMBODIMENT

Figure 1:
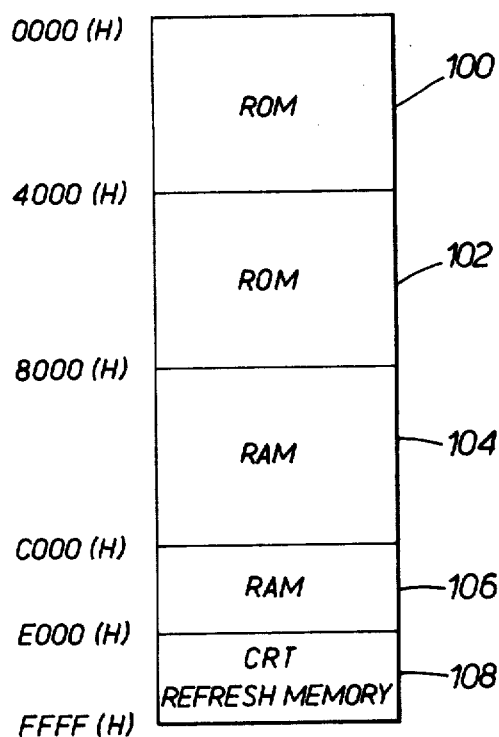
FIG. 1 is a typical prior art memory map.
Figure 2:
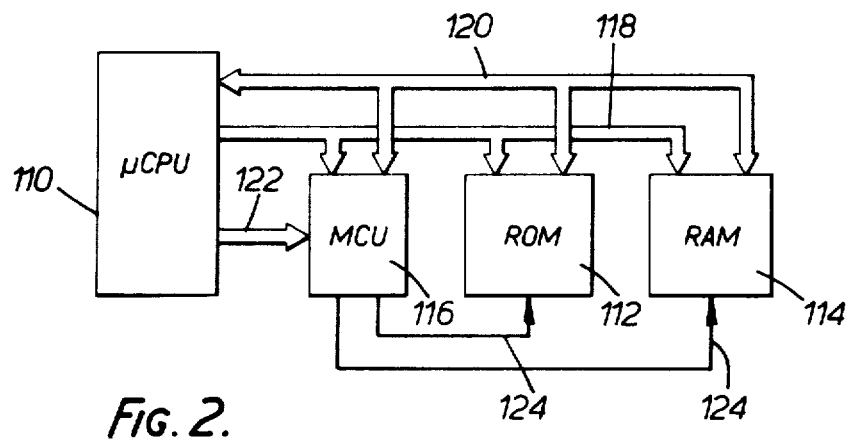
FIG. 2 is a block diagram of a memory multiplex addressing system according to the present invention.

FIG. 2 is a block diagram of the internal construction of a data processor made in accordance with this invention. In FIG. 2, micro CPU 110 interfaces with read only memory (ROM) 112 and random access memory (RAM) 114 through memory control unit (MCU) 116. Part of RAM 114 functions as a CRT refresh memory. ROM 112 and RAM 114 are directly connected to micro CPU 110 through address bus 118 and data bus 120. RAM 114 has a capacity of 32K bytes and ROM 112 has a capacity of 32K bytes, giving a total memory capacity of 64K bytes.

Control line 122 propagates a control signal generated by micro CPU 110 to memory control unit 116. After memory control unit 116 has received this signal through control line 122, it supplies memory control signals to ROM 112 and RAM 114 through control lines 124. The details of the internal construction of memory control unit 116 will be explained later with reference to FIG. 4.

Figure 3:
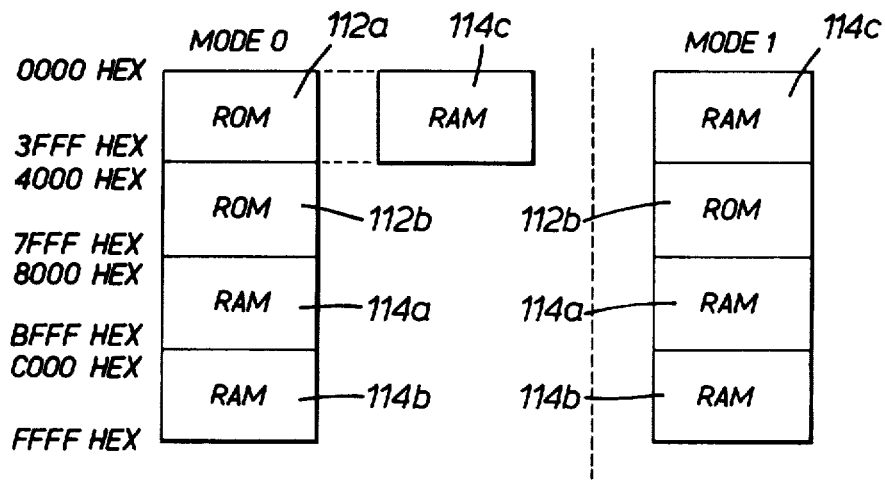
FIG. 3 is a memory map according to the invention.
Figure 4:
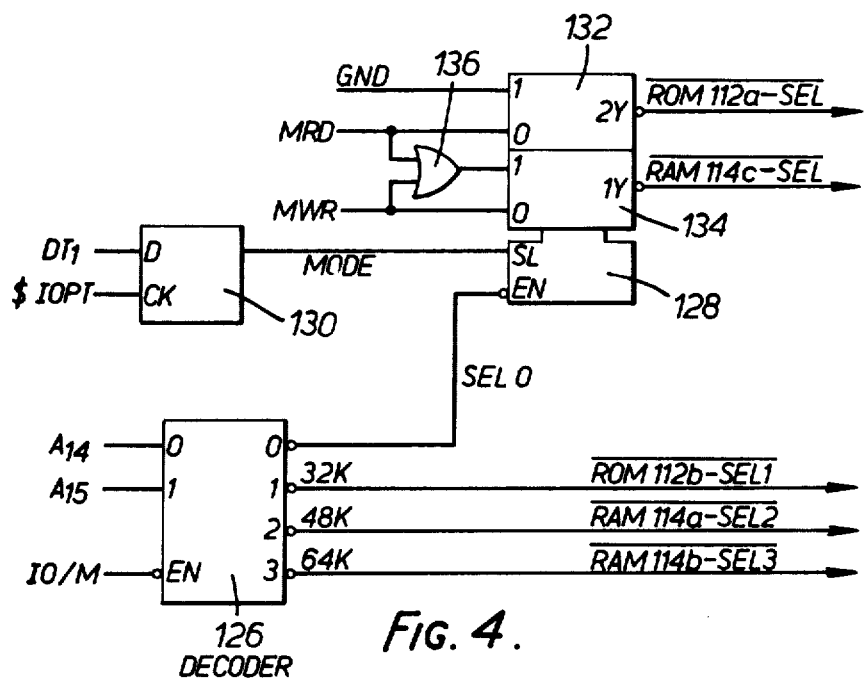
FIG. 4 is a circuit diagram of a possible memory selection circuit illustrated in FIG. 3.

FIG. 3 is a memory map showing a logical arrangement of memory in an embodiment of this invention. Assuming that the address space is 64K bytes, this is divided into four areas of 16K bytes. The memories which are included in this address space differ depending on which of two possible modes (mode "0" or mode "1") is preset. Changeover between these modes is accomplished by a mode selection circuit, which will be described later (FIG. 4).

In this embodiment, RAM 114c and ROM 112a allocated to addresses 0000 HEX - 3FFF HEX are multiplexed in the address space. RAM 114c may be, for example, a refresh memory for a CRT. When micro CPU 110 executes a program, data can only be read from ROM 112a and ROM 112b. Ordinarily, the most common operation to be performed by RAM 114c is the storing of data to be displayed. A technique, independent of CPU 110 (e.g., direct memory access), is employed to transfer data from RAM 114c to the CRT. Thus, under normal conditions, CPU 110 will only write into RAM 114c. Consequently, normally, the address space is in mode "0" and the program stored in ROM 112a and ROM 112b is performed through a series of read operations. If data is to be stored in RAM 114c, software enables the data to be written into RAM 114c in mode "0". Apart from this, ordinary access operations may be performed with respect to ROM 112b, RAM 114a, and RAM 114b whatever the mode.

In this way, even though the memory space is 64K bytes, the whole space can be used as program memory, and the 16K bytes of the CRT memory can also be used. Thus a total memory capacity of 80K bytes is available, so the memory space can effectively be expanded.

However, occasionally it will be necessary for CPU 110 to read from RAM 114c (e.g., to determine what is being displayed as a check), so that a technique for reading must also be provided. To accomplish reading, the address space is temporarily put into mode "1". This prevents the accessing of ROM 112a while enabling the accessing (either reading or writing) of RAM 114c. Consequently, software may then be provided such that CPU 110 carries out a read operation in a conventional manner.

Care must be taken when the program in ROM 112a read-accesses RAM 114c since in mode "1" accessing of ROM 112a is prevented. However, mode "1" operation does not normally require a long time, so that mode changeover need not be performed before the time when RAM 114c is to be read. By providing a subroutine in ROM 112b in which RAM 114c is read, read access can effectively and simply be carried out when the program in ROM 112a requires a read access from RAM 114c. Thus software limitations scarcely have to be worried about.

An embodiment of a mode selection circuit which carries out the mode changeover of the address space will now be explained with reference to FIG. 4. In FIG. 4, the uppermost address bits, A14 and A15 of the 16-bit address, are supplied to decoder 126. The enable terminal EN of decoder 126 is supplied with a status signal that indicates whether the program step calls for a memory input or a memory output to be performed. It is well known that this is a signal that is generated at the beginning of every machine cycle, so that an explanation of it will be omitted. Decoder 126 detects which memory 112 or 114 is to be accessed and outputs this information as selection signals SEL 0–SEL 3 at the respective output terminals 0, 1, 2 or 3. 16K bytes of memory are associated with each of output terminals 0-3, namely ROM 112a or RAM 114c, ROM 112b, RAM 114a and RAM 114b, respectively. The signal SEL 0 that is outputted from the output terminal 0 of decoder 126 is supplied to the enable terminal EN of selector 128.

Data signal DT1, indicative of the desired operating mode is applied to the D-input terminal of mode selection flip-flop 130 by an output command of micro CPU 110. Timing signals $\overline{SIOPT}$ of the memory cycle is inputted to the clock input terminal C of mode selection flip-flop 130. Data signal DT1 is set so that it is "HIGH" in mode 0 and "LOW" in mode 1. The Q output of mode selection flip-flop 130 is supplied to the selector terminal SL of selector 128. The input terminal 1 of gate 132 which is part of selector 128 is grounded, and the signal MRD that indicates that memory reading is in progress is supplied from CPU 110 to input terminal 0. Input terminal 1 of gate 134 of selector 128 is supplied with the output of OR gate 136, which receives as inputs signal MRD and a signal MWR. Signal MWR indicates that a memory write operation is in progress. The input terminal 0 is supplied with signal MWR, from micro CPU 110. Selector 128 enables either gate 132 or 134 in accordance with the content of mode selection flip-flop 130. In this embodiment of the invention, the output of gate 132 selects ROM 112a, and the output of gate 134 is outputted to RAM 114c.

The operation of the circuit shown in FIG. 4 is explained below for mode 0 and mode 1 with reference to Table 1 which illustrates the operation of selector 128.

TABLE 1

| $\overline{EN}$ | SL | MRD | MWR | RAM 114c-SEL | ROM 112a-SEL |
|---|---|---|---|---|---|
| | | | | MODE 0 | |
| 0 | 1 | 0 | 0 | 1 | 1 |
| 0 | 1 | 0 | 1 | 0 | 1 |
| 0 | 1 | 1 | 0 | 1 | 0 |
| 1 | 1 | X | X | 1 | 1 |
| | | | | MODE 1 | |
| 0 | 0 | 0 | 0 | 1 | 1 |
| 0 | 0 | 0 | 1 | 0 | 1 |
| 0 | 0 | 1 | 0 | 0 | 1 |
| 1 | 0 | X | X | 1 | 1 |

During normal operation, i.e., in mode 0, micro CPU 110 causes mode data signal DT1 to be "HIGH". Consequently, the mode setting signal MODE (see FIG. 4) is "HIGH". When the address bits A14 and A15 are both low, the SEL 0 output of decoder 126 is enabled, thus enabling the selector 128.

While a program is being read out from ROM 112a, since a read cycle is occurring, the read-out control signal MRD is "HIGH", and the writing control signal MWR is "LOW". Consequently, the output of gate 132 of selector 128 is "LOW" and the output of gate 134 is "HIGH" so ROM 112a is selected. As a result, the program is read out from ROM 112a. When RAM 114c is refreshed, a write cycle is required. Thus the control signal MWR is "HIGH" and the read-out control signal MRD is "LOW". As a result, the output of gate 134 of the selector 128 is enabled so that RAM 114c is selected. A writing operation is therefore performed on RAM 114c.

In mode 1, RAM 114c may read so as to check its contents. To enter this mode, micro CPU 110 makes the mode data signal DT1, and thus the mode setting signal, MODE, "LOW". When addresses A14 and A15 are also "LOW", selector 128 is enabled. As the contents of RAM 114c are read out, the read-out control signal MRD is "HIGH" and the writing control signal MWR is "LOW". Consequently, the output of gate 132 of selector 128 is "HIGH", and the output of gate 134 is "LOW", so that RAM 114c is selected. As a result, the display pattern or character pattern is read out from RAM 114c.

Thus, in mode 0, when gate 132 of selector 128 is selected, since its input is given by the read-indicating signal MRD only, ROM 112a can only be read. If gate 134 is selected in mode 1, since both the MRD and MWR signals are inputted through OR gate 136, RAM 114c can both be read and written into.

For accessing of addresses beyond "4000 HEX", memory selection (SEL1-SEL3) is performed by the output of decoder 126. As this is accomplished the same as in previous systems, an explanation thereof is omitted.

Thus by means of the mode selection circuit in FIG. 4, the entire 64K byte memory space can be utilized as program memory, and in addition, RAM 114c can function with 16K bytes. This makes it possible for a memory capacity of 80K bytes to be reached, i.e., an expansion of memory space can be achieved.

Figure 5:
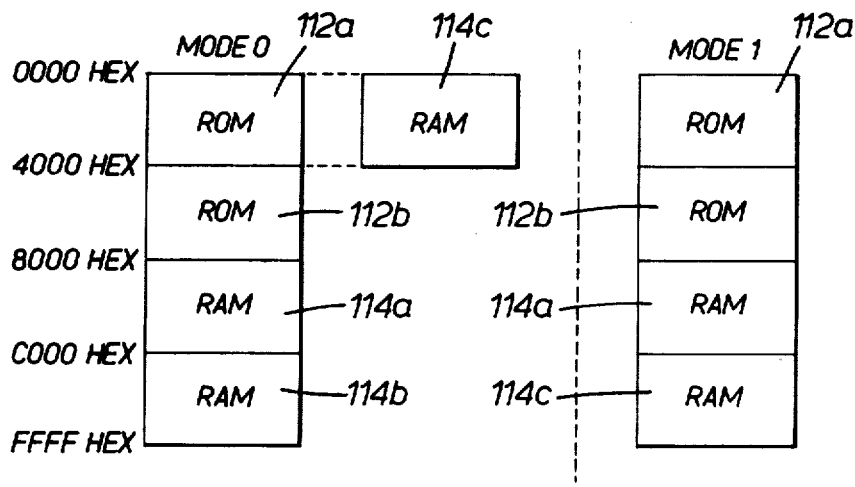
FIG. 5 is another memory map according to the invention.
Figure 6:
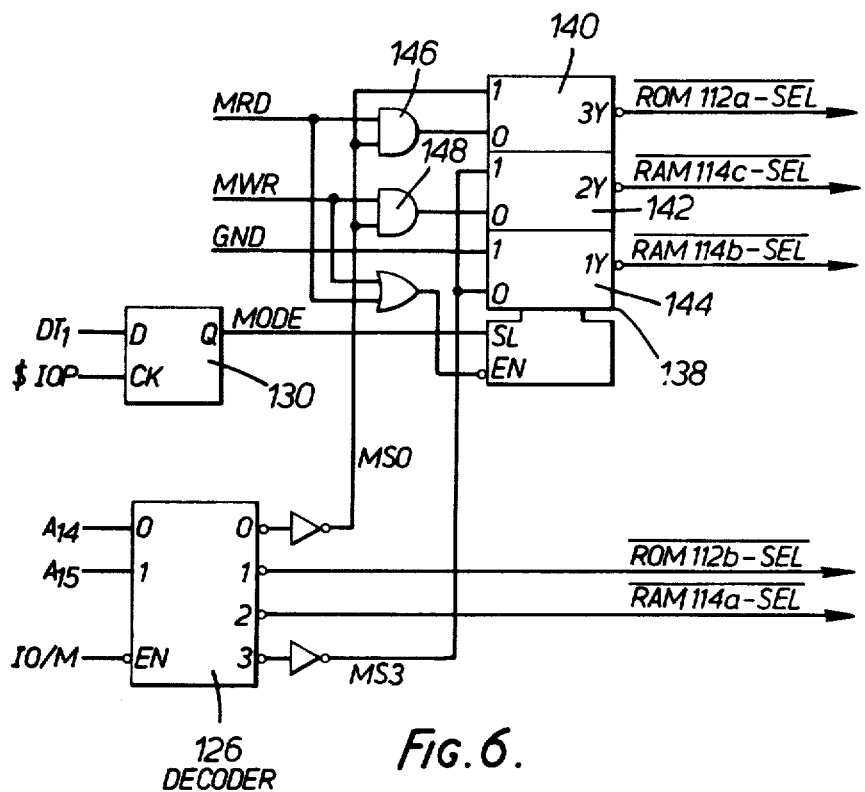
FIG. 6 is a circuit diagram of a memory selection circuit useful with the memory map of FIG. 5.

The above explanation was based on the address space of the memory map shown in FIG. 3, but the mode of organization of the address space is not so restricted. Other embodiments of the address space are shown in FIG. 5 and FIG. 7 and embodiments of the corresponding mode selection circuits are shown in FIG. 6 and FIG. 8, respectively.

First of all, a brief explanation will be given of the structure and operation of the mode selection circuit shown in FIG. 6 using the truth table of Table 2 and the address configuration shown in FIG. 5.

2. Also, AND gates 146 and 148 are inserted in front of selector 138.

Figure 7:
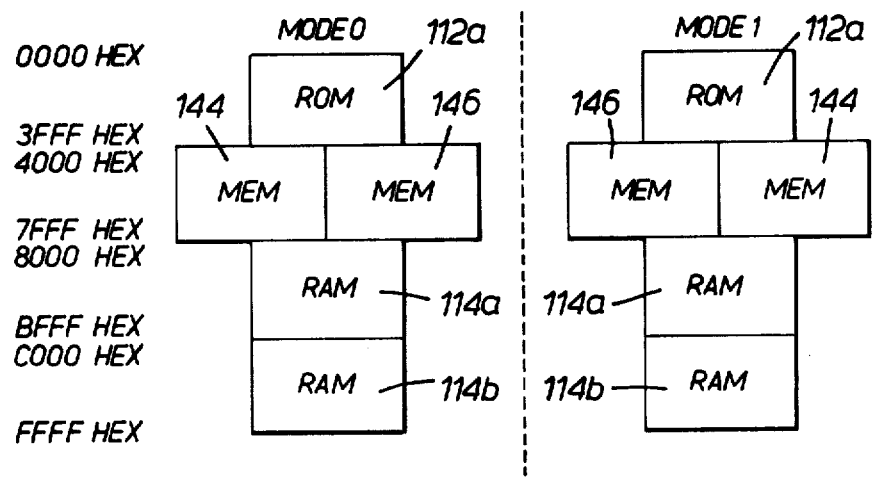
FIG. 7 is another memory map according to the present invention.
Figure 8:
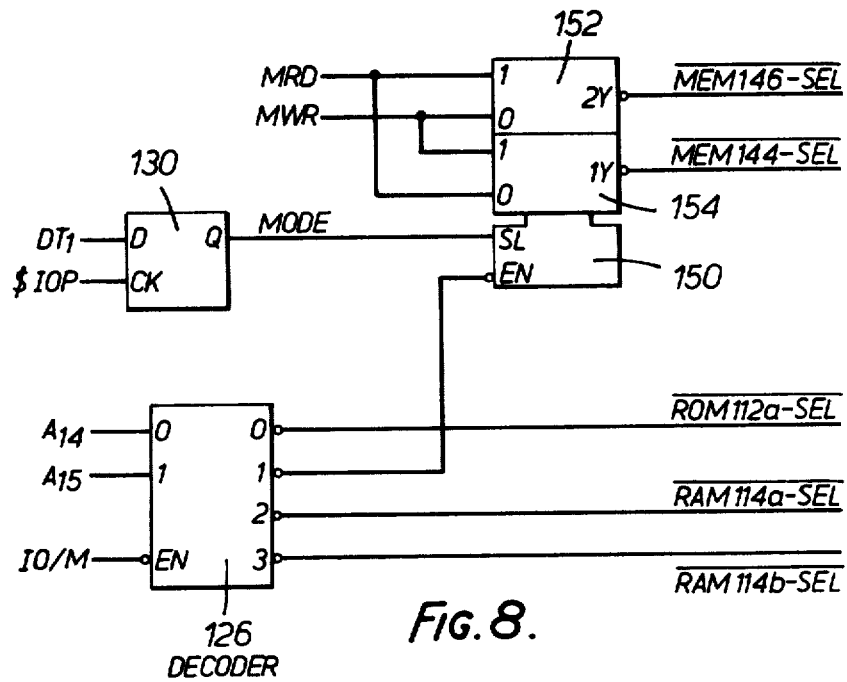
FIG. 8 is a circuit diagram of a memory selection circuit useful with the memory map of FIG. 7.

FIG. 7 differs from FIG. 3 by the substitution of memories 144 and 146 in the address space occupied by ROM 112b in FIG. 3. Memory 144 may be thought of as a program storing memory and memory 146 may be thought of as a display memory. Memory 144 may be a RAM, so that a program stored in memory 144 may be changed. However, memory 144 normally contains a program, and micro CPU 110 normally reads the program and runs it, so in almost all cases memory 144 need only be read. However, if the program content is to be changed, data must be written into memory 144. Memory 146 normally only has display data written into it by CPU 110, but sometimes it is necessary to check the letters or patterns that are being displayed, and in such cases a read operation is also necessary. Thus, memory 144 may be termed a "mainly READ memory" and memory 146 may be termed a "mainly WRITE memory". Consequently, if memories 144 and 146 are simply

TABLE 2

| MODE | MS0 | MS3 | SL | MRD | MWR | $\overline{\text{RAM 114b-SEL}}$ | $\overline{\text{RAM 144c-SEL}}$ | $\overline{\text{ROM 112a-SEL}}$ |
|---|---|---|---|---|---|---|---|---|
| MODE 0 | 1 | 0 | 1 | 0 | 0 | 1 | 1 | 1 |
|  | 1 | 0 | 1 | 0 | 1 | 1 | 0 | 1 |
|  | 1 | 0 | 1 | 1 | 0 | 1 | 1 | 0 |
|  | 0 | 1 | 1 | 0 | 0 | 1 | 1 | 1 |
|  | 0 | 1 | 1 | 0 | 1 | 0 | 1 | 1 |
|  | 0 | 1 | 1 | 1 | 0 | 0 | 1 | 1 |
|  | 0 | 0 | 1 | X | X | 1 | 1 | 1 |
| MODE 1 | 1 | 0 | 0 | 0 | 0 | 1 | 1 | 1 |
|  | 1 | 0 | 0 | 0 | 1 | 1 | 1 | 0 |
|  | 1 | 0 | 0 | 1 | 0 | 1 | 1 | 0 |
|  | 0 | 1 | 0 | 0 | 0 | 1 | 1 | 1 |
|  | 0 | 1 | 0 | 0 | 1 | 1 | 0 | 1 |
|  | 0 | 1 | 0 | 1 | 0 | 1 | 0 | 1 |
|  | 0 | 0 | 0 | X | X | 1 | 1 | 1 |

In this embodiment, as in the preceding embodiment, either of two memory maps is realized depending on the ON/OFF state of mode selection flip-flop 130. In the first of these modes, mode 0, ROM 112a and RAM 114c are located in the same address space, a read operation from micro CPU 110 in this area accesses ROM 112a, and a write operation accesses RAM 114c. The other mode, mode 1, is obtained when mode selection flip-flop 130 is set. In this mode, RAM 114b cannot be accessed by CPU 110. Instead, RAM 114c is placed in this area of the address space. In this manner, CPU 110 can both read from and write into RAM 114c. Also in mode 1, ROM 112a returns to normal access.

Usually, the micro CPU 110 only reads from ROM 112a, and writes into display RAM 114c. Thus, programs may usually be run normally even when, as in mode 0, the addresses overlap. In this way the memory space can be expanded.

However, since CPU 110 may occasionally wish to read from RAM 114c, a way must be provided to read, for example, "what letter is being displayed" or "what kind of dot pattern is being displayed". Furthermore, RAM 114c may be used as a message buffer. In such cases, RAM 114c in mode 1 can be placed in the address space occupied by RAM 114b in mode 0, so that RAM 114c in mode 1 can be read from and written into in a normal fashion.

The mode selection circuit of FIG. 5 is an example of a circuit which can realize the control referred to above. It differs from the embodiment of FIG. 4 in that selector 138 now has three gate stages 140, 142 and 144 having different transfer functions as illustrated in Table permanently assigned the same address space, the less common, although required functions of these memories could not be performed. Thus, CPU 110 must be able to read from and write into both of the memories.

An embodiment which satisfies the above requirements is the map of the address space shown in FIG. 7 and the mode selection circuit shown in FIG. 8. This embodiment also has a mode 0 and mode 1. In mode 0, memories 144 and 146 have their respective ordinary functions and occupy the same address space as read-only or write-only memories. In mode 1, a control is applied to change memory 144 over to enable write operations and memory 146 over to enable read operations.

Thus, normally, in mode 0, memories 144 and 146 operate so as to effectively increase the memory space, as if they were separate memories. Yet still, memories 144 and 146 are overlapping on the same address space, with data being read from memory 144 and data being written into memory 146. However, in special cases (when mode 1 is entered), these read and write functions are interchanged so that data can be written into memory 144 and data can be read from memory 146.

The operation of the mode selection circuit illustrated in FIG. 8 for controlling the memory configuration illustrated in FIG. 7 will now be described with reference to Table 3.

TABLE 3

| EN | SL | MRD | MWR | $\overline{\text{MEM 144-SEL}}$ | $\overline{\text{MEM 146-SEL}}$ |
|---|---|---|---|---|---|
| MODE 0 | | | | | |

TABLE 3-continued

| $\overline{EN}$ | SL | MRD | MWR | $\overline{MEM\ 144\text{-}SEL}$ | $\overline{MEM\ 146\text{-}SEL}$ |
|---|---|---|---|---|---|
| 0 | 1 | 0 | 0 | 1 | 1 |
| 0 | 1 | 0 | 1 | 1 | 0 |
| 0 | 1 | 1 | 0 | 0 | 1 |
| MODE 1 | | | | | |
| 0 | 0 | 0 | 0 | 1 | 1 |
| 0 | 0 | 0 | 1 | 0 | 1 |
| 0 | 0 | 1 | 0 | 1 | 0 |
| 1 | X | X | X | 1 | 1 |

In normal operation, i.e., mode 0, the mode data signal DT1 generated by CPU 110 is "HIGH". Consequently, the mode setting signal MODE is "HIGH". When address A14 is "HIGH" and A15 is "LOW", selector 150 is enabled. When the program is to be read out from memory 144, since a read cycle is in progress, the read control signal MRD is "HIGH" and the write control signal MWR is "LOW". Consequently, the output of gate 152 of selector 150 is "HIGH" and the output of 154 is "LOW", so memory 144 is selected and the program is read therefrom.

When it is desired to write into memory 146, since a write cycle is in progress, the write control signal MWR is "HIGH" and the read control signal MRD is "LOW". Consequently, the output of the gate 152 of the selector 150 is "LOW" and the output of the gate 154 is "HIGH", so that memory 146 is selected and the write operation is performed thereon.

In mode 1, a program is loaded into memory 144 or data stored in memory 146 is read and checked. To enter this mode, the mode-designating signal DT1 from CPU 110 is "LOW". Consequently, the mode setting signal MODE is "LOW". When the address A14 is "HIGH" and the address A15 is "LOW" selector 150 is enabled. When loading a program, the machine is in the write cycle for memory 144, so the write control signal MWR is "HIGH" and the read control signal MRD is "LOW". Consequently, the output of gate 152 of the selector 150 is "HIGH" and the output of gate 154 is "LOW" so that memory 144 is selected and the program is loaded into memory 144.

Also, when the machine is in the read cycle in mode 1, the read control signal MRD is "HIGH" and the write control signal MWR is "LOW". Consequently, the output of gate 152 of selector 150 is "LOW" and the output of gate 154 is "HIGH". Memory 146 is therefore selected and the data stored in memory 146 is read.

Figure 9:
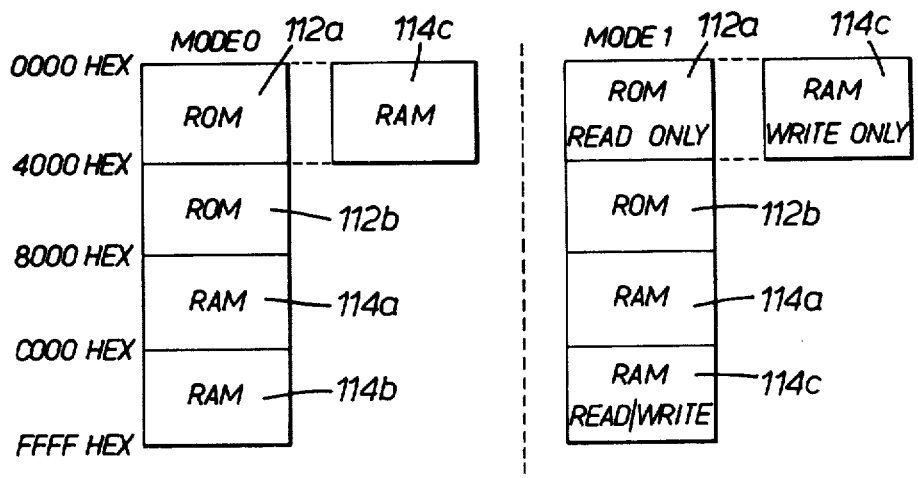
FIG. 9 is another memory map according to the present invention.
Figure 10:
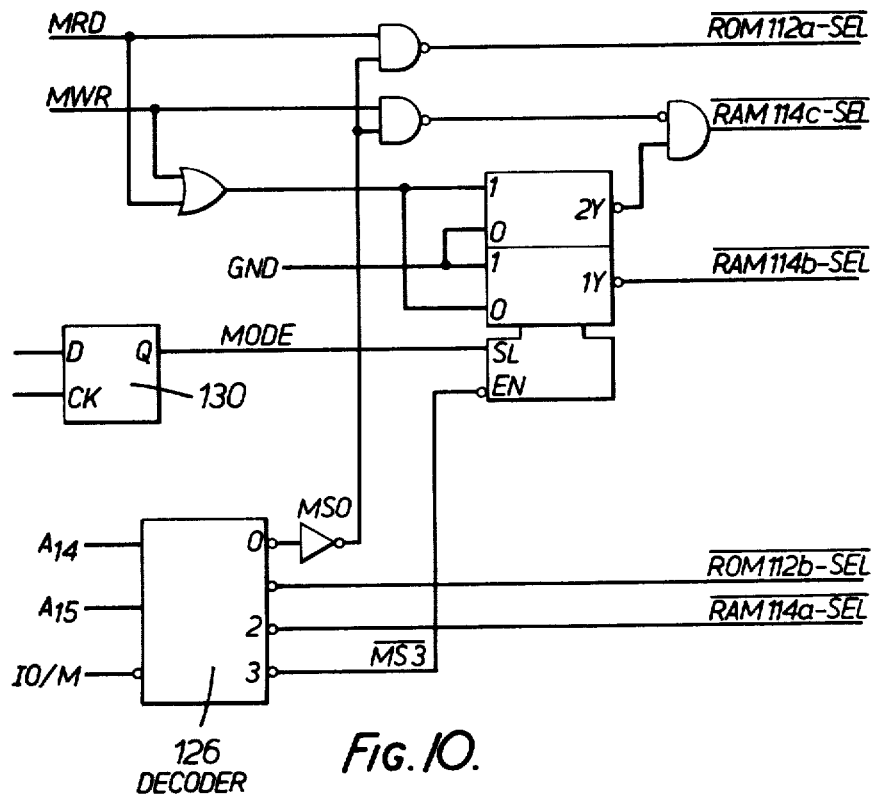
FIG. 10 is a circuit diagram of a memory selection circuit useful with the memory map of FIG. 9.
Figure 11:
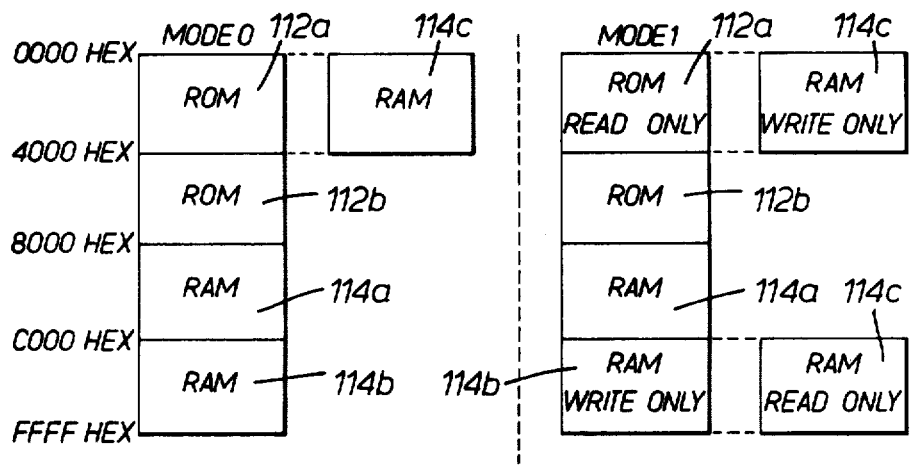
FIG. 11 is another memory map according to the present invention.
Figure 12:
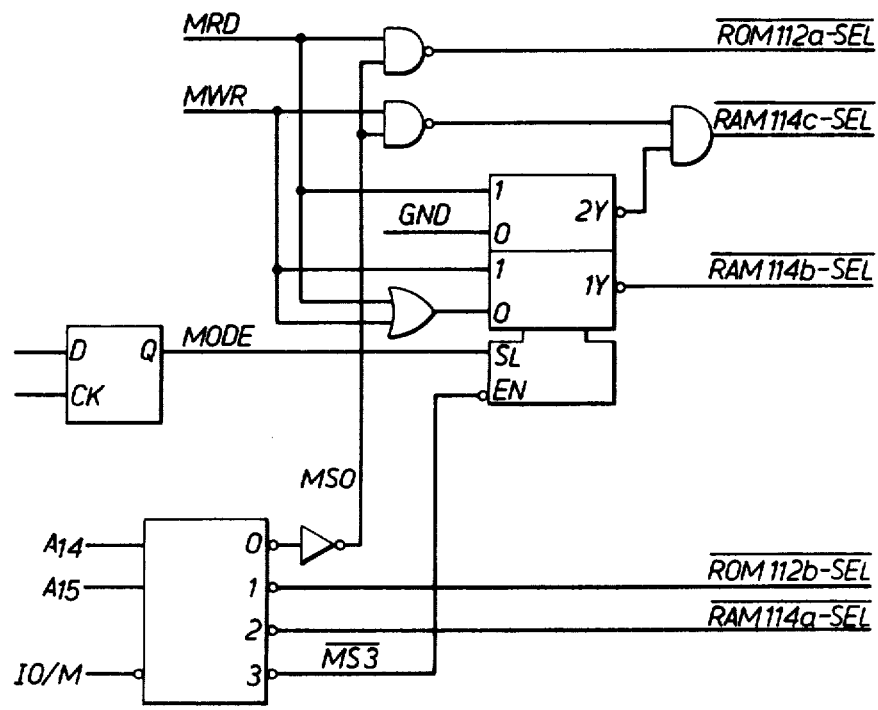
FIG. 12 is a circuit diagram of a memory selection circuit useful with the memory map of FIG. 11.

A mode selection circuit for controlling the memory map of FIG. 9 is shown in FIG. 10 and the circuit for controlling the memory map of FIG. 11 is shown in FIG. 12, respectively.

The circuit shown in FIG. 10 operates in accordance with the truth table shown in Table 4 below.

TABLE 4

| MODE | MS0 | $\overline{MS3}$ | SL | MRD | MWR | $\overline{RAM\ 114b\text{-}SEL}$ | $\overline{RAM\ 114c\text{-}SEL}$ | $\overline{ROM\ 112a\text{-}SEL}$ |
|---|---|---|---|---|---|---|---|---|
| MODE 0 | 1 | 1 | 1 | 0 | 0 | 1 | 1 | 1 |
| | 1 | 1 | 1 | 0 | 1 | 1 | 0 | 1 |
| | 1 | 1 | 1 | 1 | 0 | 1 | 1 | 0 |
| | 0 | 0 | 1 | 0 | 0 | 1 | 1 | 1 |
| | 0 | 0 | 1 | 0 | 1 | 0 | 1 | 1 |
| | 0 | 0 | 1 | 1 | 0 | 0 | 1 | 1 |
| | 0 | 1 | 1 | X | X | 1 | 1 | 1 |
| MODE 1 | 1 | 1 | 0 | 0 | 0 | 1 | 1 | 1 |
| | 1 | 1 | 0 | 0 | 1 | 1 | 0 | 1 |
| | 1 | 1 | 0 | 1 | 0 | 1 | 1 | 0 |
| | 0 | 0 | 0 | 0 | 0 | 1 | 1 | 1 |
| | 0 | 0 | 0 | 0 | 1 | 1 | 0 | 1 |
| | 0 | 0 | 0 | 1 | 0 | 1 | 0 | 1 |
| | 0 | 1 | 0 | X | X | 1 | 1 | 1 |

This may be summarized as follows. In either mode 0 or 1, when the read indicating signal (MRD) and decoder output MS0 are at "HIGH" level (address bits A14 and A15 are both "LOW"), ROM 112a is selected and the required program is read out from ROM 112a. In either mode 0 or 1, when MS0 is at "HIGH" level, and the write-designating signal (MWR) that arrives from micro CPU 110 is "HIGH", RAM 114c is accessed. Also, when mode 0 is set while $\overline{MS3}$ is "LOW" (addresses A14 and A15 both "HIGH"), RAM 114b is selected when either MRD or MWD arrive. If the mode is set to mode 1 and $\overline{MS3}$ is "LOW", when either MRD or MWR arrive, RAM 114c is selected.

The circuit shown in FIG. 12 operates according to the truth table shown in Table 5, given below.

TABLE 5

| MODE | MS0 | $\overline{MS3}$ | SL | MRD | MWR | $\overline{RAM\ 114b\text{-}SEL}$ | $\overline{RAM\ 114c\text{-}SEL}$ | $\overline{ROM\ 112a\text{-}SEL}$ |
|---|---|---|---|---|---|---|---|---|
| MODE 0 | 1 | 1 | 1 | 0 | 0 | 1 | 1 | 1 |
| | 1 | 1 | 1 | 0 | 1 | 1 | 0 | 1 |
| | 1 | 1 | 1 | 1 | 0 | 1 | 1 | 0 |
| | 0 | 0 | 1 | 0 | 0 | 1 | 1 | 1 |
| | 0 | 0 | 1 | 0 | 1 | 0 | 1 | 1 |
| | 0 | 0 | 1 | 1 | 0 | 0 | 1 | 1 |
| | 0 | 1 | 1 | X | X | 1 | 1 | 1 |
| MODE 1 | 1 | 1 | 0 | 0 | 0 | 1 | 1 | 1 |
| | 1 | 1 | 0 | 0 | 1 | 1 | 0 | 1 |
| | 1 | 1 | 0 | 1 | 0 | 1 | 1 | 0 |
| | 0 | 0 | 0 | 0 | 0 | 1 | 1 | 1 |
| | 0 | 0 | 0 | 0 | 1 | 0 | 1 | 1 |
| | 0 | 0 | 0 | 1 | 0 | 1 | 0 | 1 |
| | 0 | 1 | 0 | X | X | 1 | 1 | 1 |

This may be summarized as follows: In either mode 1 or 2, when MS0 is "HIGH", ROM 112a is selected when an MRD signal arrives, and RAM 114c is selected when an MWR signal arrives. In mode 0, ROM 112a can only be read from and RAM 114c can only be written into. However, data can be either written into or read from RAM 114b.

In mode 1, data can be either written into or read from RAM 114c. Thus, when MS3 is "LOW" and an MRD signal arrives, RAM 114c may be read from. When MS0 is "HIGH" and MWR is "HIGH", RAM 114c may be written into. In mode 1, RAM 114b can only be written into when MS3 is "LOW" and an MWR signal arrives.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A memory multiplex addressing system comprising:
   a first memory;
   a second memory;
   means for addressing said first and second memories, each address corresponding to one location in each of said first and second memories; and
   means for selecting one of said first and second memories when data is to be read and the other of said first and second memories when data is to be written.

2. A memory multiplex addressing system as recited in claim 1, wherein:
   said first and second memories are both read/write memories;
   said selecting means includes means for selecting: (1) said first memory when data is to be read and said second memory when data is to be written during a first mode, and (2) said first memory when data is to be written and said second memory when data is to be read during a second mode; and
   said system further comprises means for instituting either one of said first and second modes.

3. A memory multiplex addressing system as recited in claim 1 wherein:
   said second memory is a read/write memory; and
   said selecting means includes means for selecting: (1) said first memory when data is to be read and said second memory when data is to be written during a first mode, and (2) said second memory when data is to be either read or written during a second mode; and
   said system further comprises means for instituting either one of said first and second modes.

4. A memory multiplex addressing system as recited in claim 1 wherein:
   said system further comprises a third memory;
   said selecting means includes means for selecting: (1) said third memory in response to a third memory address signal, one of said first and second memories in response to both a first and second memory address signal and a read signal, and the other of said first and second memories in response to both said first and second memory address signal and a write signal during a first mode, and (2) said first memory in response to said first and second memory address signal, and said second memory in response to said third memory address signal during a second mode; and
   said system further comprises means for instituting either one of said first and second modes.

5. A memory multiplex addressing system as recited in claim 1 wherein:
   said system further comprises a third memory;
   said selecting means includes means for selecting one of said first and second memories in response to a first and second memory address signal and a read signal, the other of said first and second memories in response to both said first and second memory address signal and a write signal, and for selecting (1) said third memory in response to a third memory address signal during a first mode, and (2) said second memory in response to said third memory address signal during a second mode; and
   said system further comprises means for instituting either one of said first and second modes.

6. A memory multiplex addressing system as recited in claim 1 wherein:
   said second memory is a read/write memory;
   said system further comprises a third memory;
   said selecting means includes means for selecting said first memory in response to a first and second memory address signal and a read signal, and said second memory in response to said first and second memory address signal and a write signal, and for selecting (1) said third memory in response to a third memory address signal during a first mode, and (2) said third memory in response to said third memory address signal and a write signal, and said second memory in response to said third memory address signal and a read signal; and
   said system further comprises means for instituting either one of said first and second modes.

7. A memory multiplex addressing system as recited in claim 1, 4 or 5 wherein said second memory is a read/write memory.

8. A memory multiplex addressing system as recited in claim 7, wherein said second memory comprises a CRT refresh memory.

9. A memory multiplex addressing system as recited in claim 2, 3, 4 or 6, wherein said means for selecting and means for instituting comprise:
   decoding means for selecting both said first and said second memories;
   a flip-flop for generating a mode setting signal representing a selected mode; and
   selecting means, responsive to said flip-flop and said decoding means, for selecting either one of said first and second memories in response to said mode setting signal and a read/write signal.

10. A memory multiplex addressing system as recited in claim 1, 3, 4, 5 or 6, wherein said first memory is a read only memory.

11. A memory multiplex addressing system as recited in claim 4, 5 or 6, wherein said third memory is a read/write memory.

* * * * *